United States Patent [19]

Joyce et al.

[11] 4,295,202

[45] Oct. 13, 1981

[54] HEXADECIMAL DIGIT SHIFTER OUTPUT CONTROL BY A PROGRAMMABLE READ ONLY MEMORY

[75] Inventors: Thomas J. Joyce, Burlington; David E. Cushing, Chelmsford, both of Mass.

[73] Assignee: Honeywell Information Systems Inc., Waltham, Mass.

[21] Appl. No.: 92,810

[22] Filed: Nov. 9, 1979

[51] Int. Cl.[3] .......... G06F 7/48

[52] U.S. Cl. .......... 364/748; 364/744

[58] Field of Search .......... 364/748, 744, 715

[56] References Cited

U.S. PATENT DOCUMENTS 3,234,368 2/1966 Kregness .......... 364/748

3,454,750 7/1969 Shimabukuro .......... 364/744

3,692,990 9/1972 Kurokawa et al. .......... 364/744

3,829,673 8/1974 Bouton, Jr. et al. .......... 364/748

4,130,879 12/1978 Cushing .......... 364/748

*Primary Examiner*—Jerry Smith

*Attorney, Agent, or Firm*—George Grayson; Nicholas Prasinos; Ronald T. Reiling

[57] ABSTRACT

A Scientific Instruction Processor (SIP) uses a Programmable Read Only Memory (PROM) to control the output of a two stage shifter. The shifter performs the necessary mantissa shift operations of shift right, shift left, shift right around, as well as inserting certain constant information into the system. Control signals and shift signals applied to the input address terminals of the PROM select the PROM output signals which enable the selected mantissa hexadecimal digits which output the shifter. This forces hexadecimal digits from the enabled positions and hexadecimal ZERO digits in those positions not enabled.

20 Claims, 8 Drawing Figures

| PROM ADDRESS (DECIMAL) | PROM 100 SHDDE0-3-00 | | | | PROM 102 SHDDE4-7-00 | | | | PROM 104 SHDDE8-B-00 | | | | PROM 106 SHDDEC-F-00 | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 000-127 | 0 | 0 | 0 | 0 | 0 | 0 | 0 | 0 | 0 | 0 | 0 | 0 | 0 | 0 | 0 | 0 |
| 128-239 | 1 | 1 | 1 | 1 | 1 | 1 | 1 | 1 | 1 | 1 | 1 | 1 | 1 | 1 | 1 | 1 |
| 240 | 1 | 1 | 1 | 1 | 1 | 1 | 1 | 1 | 1 | 1 | 1 | 1 | 1 | 1 | 1 | 0 |
| 241 | 1 | 1 | 1 | 1 | 1 | 1 | 1 | 1 | 1 | 1 | 1 | 1 | 1 | 1 | 0 | 0 |
| 242 | 1 | 1 | 1 | 1 | 1 | 1 | 1 | 1 | 1 | 1 | 1 | 1 | 1 | 0 | 0 | 0 |
| 243 | 1 | 1 | 1 | 1 | 1 | 1 | 1 | 1 | 1 | 1 | 1 | 1 | 0 | 0 | 0 | 0 |
| 244 | 1 | 1 | 1 | 1 | 1 | 1 | 1 | 1 | 1 | 1 | 1 | 0 | 0 | 0 | 0 | 0 |
| 245 | 1 | 1 | 1 | 1 | 1 | 1 | 1 | 1 | 1 | 1 | 0 | 0 | 0 | 0 | 0 | 0 |
| 246 | 1 | 1 | 1 | 1 | 1 | 1 | 1 | 1 | 1 | 0 | 0 | 0 | 0 | 0 | 0 | 0 |
| 247 | 1 | 1 | 1 | 1 | 1 | 1 | 1 | 1 | 0 | 0 | 0 | 0 | 0 | 0 | 0 | 0 |
| 248 | 1 | 1 | 1 | 1 | 1 | 1 | 1 | 0 | 0 | 0 | 0 | 0 | 0 | 0 | 0 | 0 |
| 249 | 1 | 1 | 1 | 1 | 1 | 1 | 0 | 0 | 0 | 0 | 0 | 0 | 0 | 0 | 0 | 0 |
| 250 | 1 | 1 | 1 | 1 | 1 | 0 | 0 | 0 | 0 | 0 | 0 | 0 | 0 | 0 | 0 | 0 |
| 251 | 1 | 1 | 1 | 1 | 0 | 0 | 0 | 0 | 0 | 0 | 0 | 0 | 0 | 0 | 0 | 0 |
| 252 | 1 | 1 | 1 | 0 | 0 | 0 | 0 | 0 | 0 | 0 | 0 | 0 | 0 | 0 | 0 | 0 |
| 253 | 1 | 1 | 0 | 0 | 0 | 0 | 0 | 0 | 0 | 0 | 0 | 0 | 0 | 0 | 0 | 0 |
| 254 | 1 | 0 | 0 | 0 | 0 | 0 | 0 | 0 | 0 | 0 | 0 | 0 | 0 | 0 | 0 | 0 |
| 255 | 0 | 0 | 0 | 0 | 0 | 0 | 0 | 0 | 0 | 0 | 0 | 0 | 0 | 0 | 0 | 0 |
| 256-374 | 1 | 1 | 1 | 1 | 1 | 1 | 1 | 1 | 1 | 1 | 1 | 1 | 1 | 1 | 1 | 1 |
| 375 | 1 | 1 | 0 | 0 | 0 | 0 | 1 | 1 | 1 | 1 | 1 | 1 | 1 | 1 | 1 | 1 |
| 376 | 1 | 1 | 0 | 0 | 1 | 1 | 1 | 1 | 1 | 1 | 1 | 1 | 1 | 1 | 1 | 1 |
| 377 | 1 | 1 | 1 | 1 | 0 | 0 | 1 | 1 | 1 | 1 | 1 | 1 | 1 | 1 | 1 | 1 |
| 378 | 1 | 1 | 1 | 1 | 1 | 1 | 0 | 0 | 1 | 1 | 1 | 1 | 1 | 1 | 1 | 1 |
| 379 | 1 | 1 | 1 | 1 | 1 | 1 | 1 | 1 | 0 | 0 | 1 | 1 | 1 | 1 | 1 | 1 |
| 380 | 1 | 1 | 1 | 1 | 1 | 1 | 1 | 1 | 1 | 1 | 0 | 0 | 1 | 1 | 1 | 1 |
| 381 | 1 | 1 | 1 | 1 | 1 | 1 | 1 | 1 | 1 | 1 | 1 | 1 | 0 | 0 | 1 | 1 |
| 382 | 1 | 1 | 1 | 1 | 1 | 1 | 1 | 1 | 1 | 1 | 1 | 1 | 1 | 1 | 0 | 0 |
| 383 | 0 | 0 | 0 | 0 | 0 | 0 | 0 | 0 | 0 | 0 | 0 | 0 | 0 | 0 | 0 | 0 |
| 384 | 0 | 0 | 0 | 0 | 0 | 0 | 0 | 0 | 0 | 0 | 0 | 0 | 0 | 0 | 0 | 1 |
| 385 | 0 | 0 | 0 | 0 | 0 | 0 | 0 | 0 | 0 | 0 | 0 | 0 | 0 | 0 | 1 | 1 |
| 386 | 0 | 0 | 0 | 0 | 0 | 0 | 0 | 0 | 0 | 0 | 0 | 0 | 0 | 1 | 1 | 1 |
| 387 | 0 | 0 | 0 | 0 | 0 | 0 | 0 | 0 | 0 | 0 | 0 | 0 | 1 | 1 | 1 | 1 |
| 388 | 0 | 0 | 0 | 0 | 0 | 0 | 0 | 0 | 0 | 0 | 0 | 1 | 1 | 1 | 1 | 1 |
| 389 | 0 | 0 | 0 | 0 | 0 | 0 | 0 | 0 | 0 | 0 | 1 | 1 | 1 | 1 | 1 | 1 |
| 390 | 0 | 0 | 0 | 0 | 0 | 0 | 0 | 0 | 0 | 1 | 1 | 1 | 1 | 1 | 1 | 1 |
| 391 | 0 | 0 | 0 | 0 | 0 | 0 | 0 | 0 | 1 | 1 | 1 | 1 | 1 | 1 | 1 | 1 |
| 392 | 0 | 0 | 0 | 0 | 0 | 0 | 0 | 1 | 1 | 1 | 1 | 1 | 1 | 1 | 1 | 1 |
| 393 | 0 | 0 | 0 | 0 | 0 | 0 | 1 | 1 | 1 | 1 | 1 | 1 | 1 | 1 | 1 | 1 |
| 394 | 0 | 0 | 0 | 0 | 0 | 1 | 1 | 1 | 1 | 1 | 1 | 1 | 1 | 1 | 1 | 1 |
| 395 | 0 | 0 | 0 | 0 | 1 | 1 | 1 | 1 | 1 | 1 | 1 | 1 | 1 | 1 | 1 | 1 |
| 396 | 0 | 0 | 0 | 1 | 1 | 1 | 1 | 1 | 1 | 1 | 1 | 1 | 1 | 1 | 1 | 1 |
| 397 | 0 | 0 | 1 | 1 | 1 | 1 | 1 | 1 | 1 | 1 | 1 | 1 | 1 | 1 | 1 | 1 |
| 398 | 0 | 1 | 1 | 1 | 1 | 1 | 1 | 1 | 1 | 1 | 1 | 1 | 1 | 1 | 1 | 1 |
| 399-511 | 1 | 1 | 1 | 1 | 1 | 1 | 1 | 1 | 1 | 1 | 1 | 1 | 1 | 1 | 1 | 1 |

FIG. 5

HEXADECIMAL DIGIT SHIFTER OUTPUT CONTROL BY A PROGRAMMABLE READ ONLY MEMORY

RELATED APPLICATIONS

1. "Automatic Operand Length Control of the Results of a Scientific Arithmetic Operation", invented by Thomas F. Joyce, Richard A. Lemay and William E. Woods, Ser. No. 092,619, filed on Nov. 8, 1979 and assigned to the same assignee as named herein.

2. "Apparatus for Performing the Scientific ADD Instruction", invented by Thomas F. Joyce, Richard A. Lemay, William E. Woods and Richard P. Brown, Ser. No. 093,096, filed on Nov. 8, 1979 and assigned to the same assignee as named herein.

3. "Automatic Rounding of Floating Point Operands", invented by Thomas F. Joyce, Ser. No. 092,907, filed on Nov. 9, 1979, and assigned to the same assignee as named herein.

BACKGROUND OF THE INVENTION

1. Field of Use

This invention relates generally to the scientific instruction processor floating point arithmetic operations and more specifically to the use of a programmable read only memory (PROM) to control the output of the mantissa digit shifters.

2. Description of the Prior Art

Scientific instruction processors perform floating point arithmetic operations. A floating point operand contains a mantissa, a mantissa sign and an exponent. The exponent indicates the position of the decimal point. Usually, the processor sets the exponent so as to form a fractional normalized mantissa, fractional in that the decimal point is to the left of the most significant digit position, and normalized in that the most significant digit position contains a digit other than zero. A digit may typically be in hexadecimal, decimal, octal, binary, coded decimal, binary bit, etc., form. Assuming a hexadecimal digit of $12A.6\times16^7$ where $12A.6_{16}$ is the mantissa and $7_{16}$ is the exponent, the fractional normalized form is $0.12A6\times16^4$. Certain floating point arithmetic operations require that the mantissa of one operand be shifted in accordance with the difference in exponents of the one operand with another operand. Also, there are requirements for left shift, right shift and shift around operations.

U.S. Pat. No. 4,130,879 entitled "Apparatus For Performing Floating Point Arithmetic Operations Using Submultiple Storage" describes a system using multidigit shifter logic circuits, shift control logic circuits, and multiplexer circuits to perform the shift operation. This system, however, has the problem of being slower and requires additional hardware for control of the shift operations.

It should be understood that the references cited herein are those of which the applicants are aware, and are presented to acquaint the reader with the level of skill in the art, and may not be the closest reference to the invention. No representation is made that any search has been conducted by the applicants.

OBJECTS OF THE INVENTION

Accordingly, it is a primary object of the invention to provide a scientific instruction processor with apparatus for providing increased throughput and reduced hardware cost when processing floating point arithmetic operations.

It is another object of the invention to provide shifter apparatus which provides increased throughput when processing floating point instructions.

It is still another object of the invention to provide shifter apparatus with improved output control for forcing ZEROs to the left or ZEROs to the right of operands undergoing the shift operation.

It is yet another object of the invention to provide shifter apparatus with improved output control for applying constants and other miscellaneous information to the system.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 5 shows a layout of the programmable read only memory address locations.

SUMMARY OF THE INVENTION

The shifter unit performs hexadecimal digit operations on operands including shift left, shift right, shift right around, information substitution operations, and floating point to integer precision error detection operations.

The shifter unit includes a two stage shifter whose output signals are applied to the inputs of a plurality of multiplexers. The multiplexers are enabled by the output signals of a programmable read only memory (PROM). Signals indicating the number of hexadecimal positions the operand is to be shifted are applied to the address selection terminals of the shifter and to the input address terminals of the PROM. Firmware signals are also applied to the input address terminals of the PROM as well as the select terminals of the multiplexers.

The PROM output signals applied to the enable terminals of the multiplexers allow the selected hexadecimal characters to be applied to an arithmetic logic unit. The PROM output signals may also force the required hexadecimal ZERO characters to the left or right of the operand. Also, if the shift signals indicate a shift right which is greater than the capacity of the shifter, then the PROM output signals force the multiplexers to generate hexadecimal ZERO output signals.

The firmware signals applied to the PROM input address terminals and the select terminals of the multiplexers provide certain constant information at the output of the multiplexers.

The PROM output signals are used in the floating point to integer conversion to test for a precision error. The shift signals applied to the control terminals of the shifter and the input address terminals of the PROM are a measure of the size of a register in the central processor in order to determine how many hexadecimal positions to enable. The PROM output signals enable those hexadecimal positions to the right of the register size. If those hexadecimal positions indicate hexadecimal ZEROs, then there is no precision error. There is an indication of a precision error if those hexadecimal positions indicate hexadecimal characters other than hexadecimal ZERO.

DESCRIPTION OF THE PREFERRED EMBODIMENT

Figure 1:
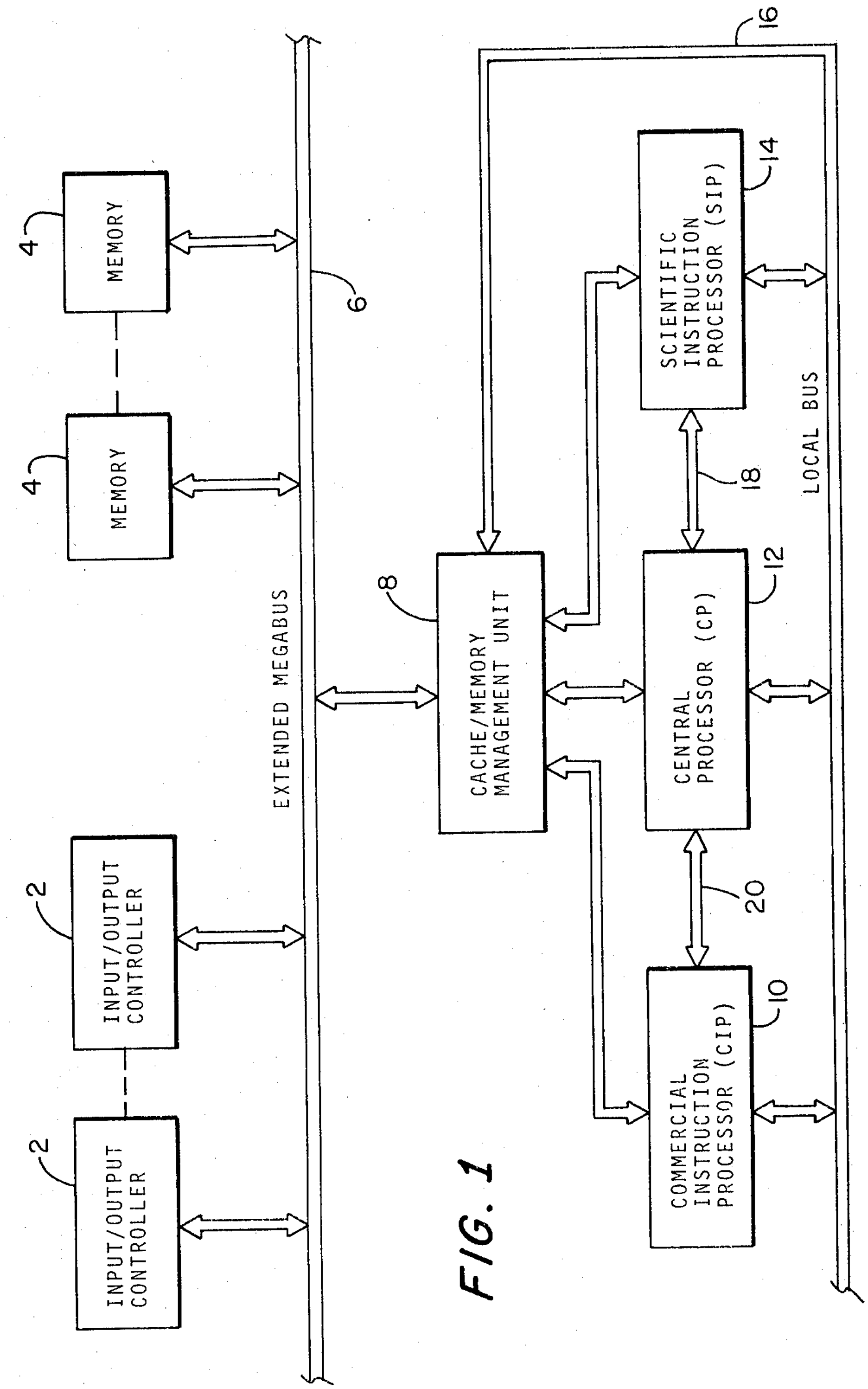
FIG. 1 is the overall block diagram of the system.

FIG. 1 shows a block diagram of the overall system in which the present invention may be incorporated which includes a plurality of input/output controllers 2 and a plurality of memory modules 4 coupled in common to an extended bus 6. Also coupled to bus 6 is a cache/memory management unit 8.

The system further includes a central processor (CP) 12, a commercial instruction processor (CIP) 10, and a scientific instruction processor (SIP) 14 coupled in common to a local bus 16 and also coupled to the cache/memory management unit 8, which is also coupled to bus 16. The SIP 14 and CP 12 are coupled by a CP-SIP bus 18. CP 12 and the CIP 10 are also coupled by a CP-CIP bus 20.

The functions of the input/output controllers 2 and memory 4 are well known in the art and will be described only as they relate to the invention. The CP 12 receives information in the form of computer instructions from memory 4 through cache/memory management unit 8. The SIP 14 executes scientific instructions received by CP 12 which include floating point instructions. The CIP 10 executes instructions received by the CP 12 to facilitate the processing of character strings and decimal data.

Figure 2:
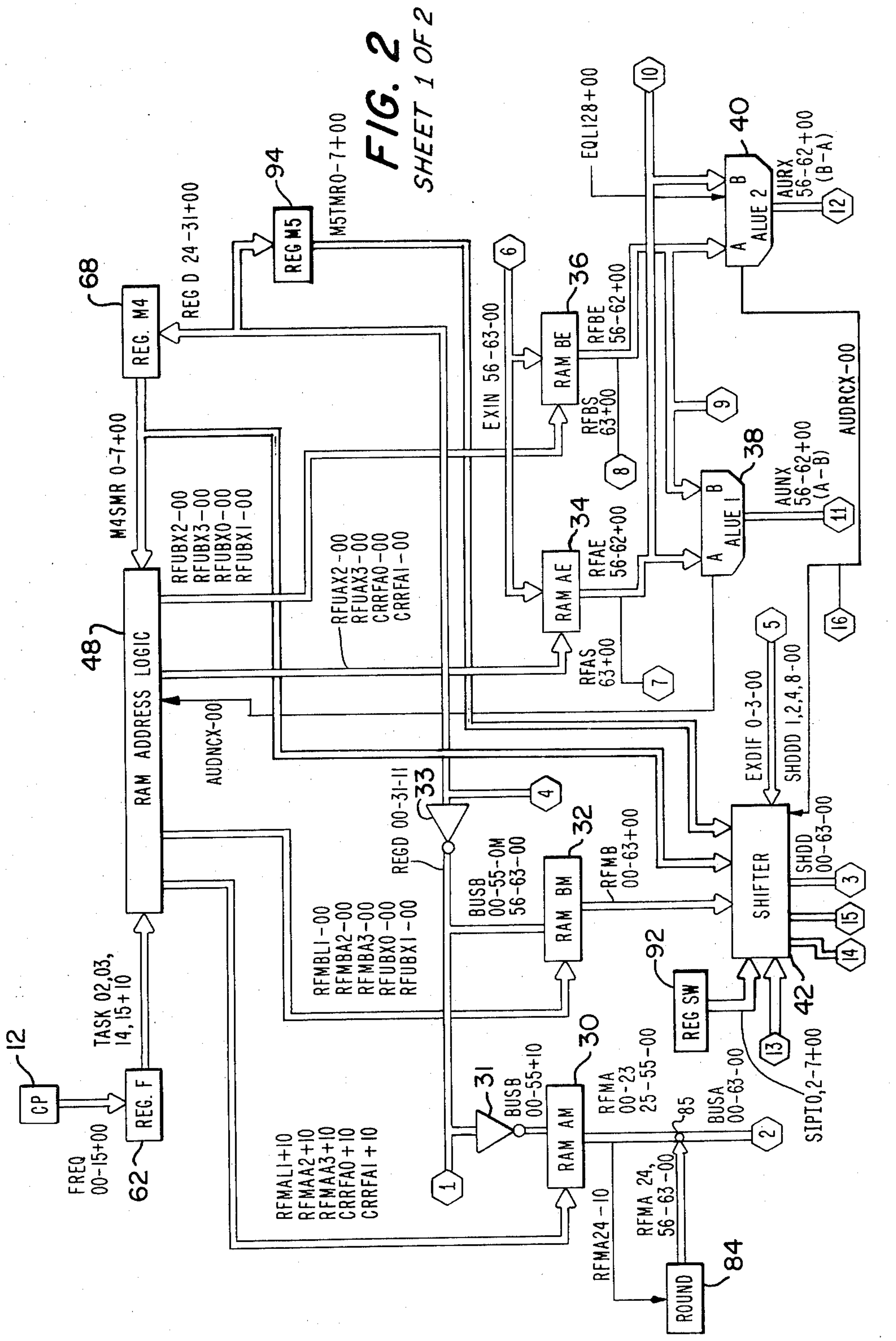
FIG. 2 is the overall block diagram of the scientific instruction processor.
Figure 2:
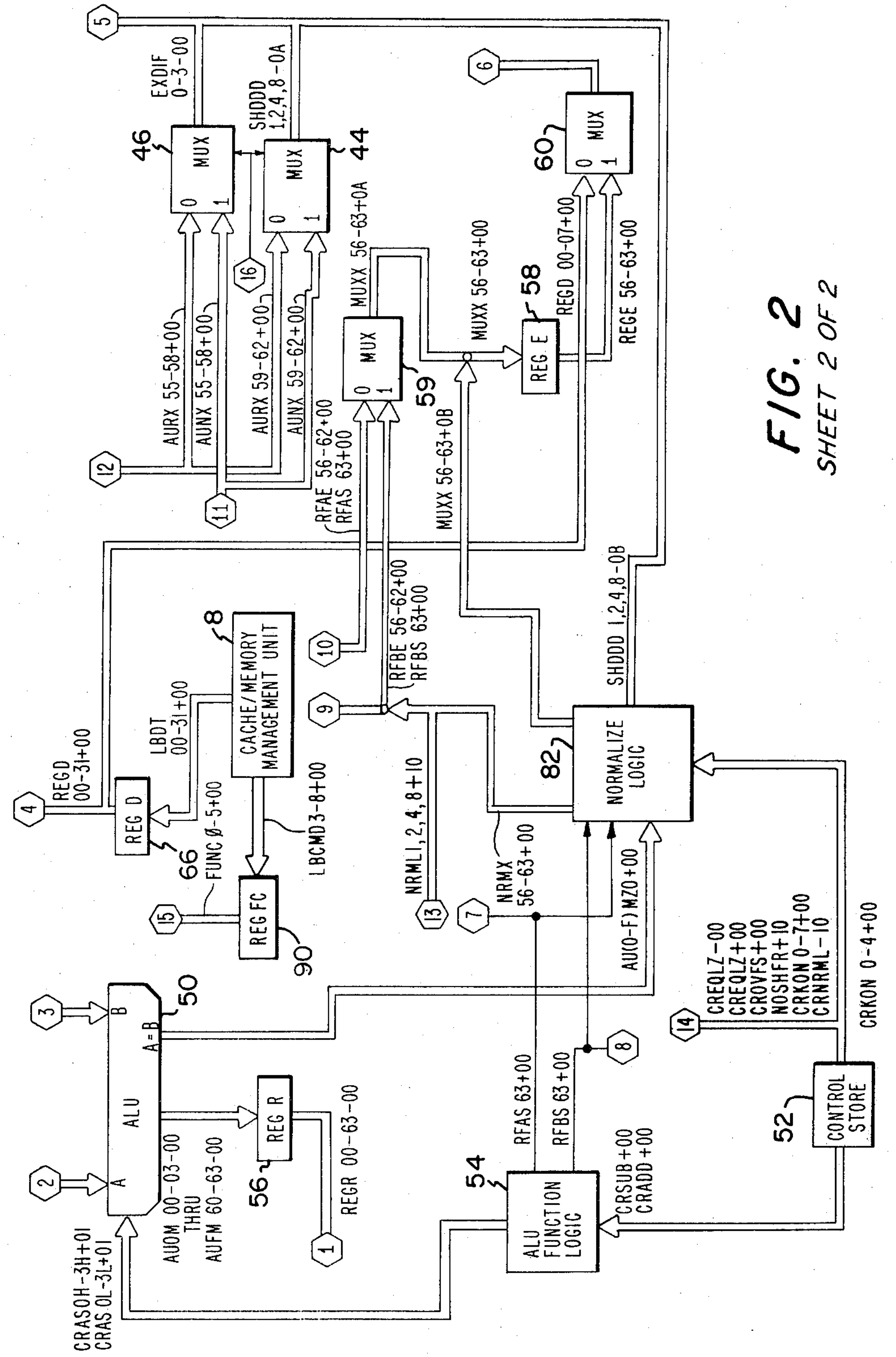

Referring to FIG. 2, operands are received into a register REGD 66 from the extended megabus 6 through the cache/memory management unit 8. The exponents and mantissa signs are stored in random access memories (RAMs) RAMAE 34 and RAMBE 36. The mantissas are stored in random access memories (RAMs) RAMAM 30 and RAMBM 32.

The scientific ADD instruction processed by the scientific instruction processor may be used to describe the invention.

A floating point operand can be 32 bits or 64 bits in length including a 7 bit exponent, a 1 bit matissa sign, and either a 24 or 56 bit mantissa. The exponent is in excess 64 form with the range of value from −64 to +63. The mantissa is negative when the sign bit is at logical ONE and positive when the sign bit is at logical ZERO. The mantissa is a fractional number with the hexadecimal point to the left of the high order bit of the mantissa.

The scientific ADD instruction adds the contents of the effective address (EA) in memory 4 to the contents of a scientific accumulator in SIP 14, and the result is stored in the accumulator. For the purposes of discussion, operand # is stored in scientific accumulator # (SA#) and operand N is stored in the EA.

The scientific ADD therefore performs the operation of (SA#)←(SA#)+(EA) where () indicates "the contents of".

FIG. 2 shows an overall block diagram of the SIP 14. RAMAM 30 is a 56 bit by 16 address location random access memory (RAM) and stores the mantissa of operand # in SA# and the mantissa of operand N in SAN. It comprises 14 74S189 circuits. Three address locations are set aside as scientific accumulators. One of the scientific accumulators is assigned by the SIP 14 logic as SA# and a second scientific accumulator which stores the (EA) is assigned as SAN.

RAMBM 32 is a 64 bit by 16 address location random access memory and stores the mantissa of operand # in SA# and the mantissa of operand N in SAN. It comprises 16 74S189 circuits. RAMAE 34 and RAMBE 36 are 8 bit by 16 address location random access memories and store the exponent and mantissa signs of operand # and operand N in both RAMAE 34 and RAMBE 36. Each RAM, RAMAE 34 and RAMBE 36, comprises two 74S189 circuits. The 74S189 circuits are described in "The TTL Databook for Design Engineers", Second Edition, published by Texas Instruments. For the scientific ADD instruction, the exponent and mantissa signs of operand # are selected as the output signals of RAMAE 34, and the exponent and mantissa sign of operand N are selected as the output signals of RAMBE 36.

Both the RAMAE 34 and the RAMBE 36 output signals are coupled to arithmetic logic units ALUE1 38 and ALUE2 40. ALUE1 38 and ALUE2 40 are each made up of two 74S181 circuits. The exponent of SA# is read from RAMAE 34 and is applied to the A input terminal of ALUE1 38 and the B input terminal of ALUE2 40 as output signals RFAE56−62+00. Similarly, the exponent of SAN is read from RAMBE 36 and is applied to the A input terminals of ALUE2 40 and the B input terminals of ALUE1 38 as output signals RFBE56−62+00.

ALUE1 38, by means of an AUDNCX-00 signal applied to RAM address logic 48, indicates the operand with the smaller exponent and selects that mantissa to be read from RAMBM 32 and applied to shifter 42. The output signals AUNX56−62+00 and AURX56−62+00 of ALUE1 38 and ALUE2 40 respectively also indicate the magnitude of the difference, which is applied to the shifter 42 to shift the mantissa of the operand with the smaller exponent to the right the number of places required to align the two mantissas for the scientific ADD operation.

MUXs 44 and 46 select the two hexadecimal digits which represent the absolute difference between the exponents in SA# and SAN. ALUE1 38 indicates the difference of the SA# exponent minus the SAN exponent, and ALUE2 40 indicates the difference of the SAN exponent minus the SA# exponent.

A logic signal AUDRCX−00, an output signal of ALUE2 40, is applied to the select terminals of MUXs 44 and 46, and when at logical ZERO, indicates that the operand N exponent is larger than or equal to the operand # exponent. The AURX 55−62 output signals are selected through MUX's 44 and 46 and are applied to shifter 42 by means of output signals SHDDD 1,2,4,8−00 and EXDIF 0−3−00, which indicate the magnitude of the number of hexadecimal digits to be right shifted. The logic signal AUDRCX−00 at logical ONE indicates that the operand # exponent is larger than or equal to the operand N exponent. The AUNX 55−62 output signals are selected through MUXs 44 and 46 for transfer to the shifter 42.

If the SA# mantissa is selected from RAMAM 30, then the SAN mantissa is selected from RAMBM 32 and vice versa. RAM address logic 48 address select signals RFMBL1−00, RFMBA2−00, RFMBA3−00, RFUBX0−00 and RFUBX1−00 select the mantissas of SAN or SA# of RAMBM 32. Address select signals RFMAL1+10, RFMAA2+10, RFMAA3+10, CRRFA0+10 and CRRFA1+10 select the mantissas of SA# or SAN of RAMAM 30.

The output signals RFMB00−63+00 of RAMBM 32 are applied to shifter 42 and shifted the number of positions to the right specified by signals EXDIF0−3−00 and SHDDD1,2,4, 8−00. The shifter 42 output signals SHDD00−63−00 are applied to the B input terminals of an ALU 50. The output signals RFMA00−23, 25−55−00 and RFMA24, 56−63−00 are applied to a junction 85. Signals BUSA00−63−00 are applied to the A terminal of ALU 50 from junction 85. ALU 50 comprises 16 74S181 circuits. The result signals AU0M00−03−00 through AUFM60−63−00 are stored in a register REGR 56. The output signals REGR00−63−00 are applied to the input of RAMAM 30 and RAMBM 32 to be written into the address location defined as SA#. The larger exponent and its mantissa sign are written into SA# of RAMAE 34 and RAMBE 36 through a multiplexer (MUX) 59, a register REGE 58, and a MUX 60 under firmware control.

A normalization cycle is required if the high order hexadecimal digit is a hexadecimal ZERO. Signals AU(0−F)MZ0+00 applied to normalize logic 82 from the ALU 50 indicate which of the 16 hexadecimal digits are at hexadecimal ZERO. Normalize logic 82 generates shift signals SHDDD 1,2,4,8−0B, which are applied to the shifter 42. Shifter 42 shifts the operand result read from SA# of RAMBM 32 to place the most significant hexadecimal digit in the high order position of the operand. Signals NRMX56−63+00 are applied to the B input terminal of ALUE1 38 to indicate the number of leading hexadecimal ZEROs in the operand to be normalized. Signals NRMX56−63+00 are subtracted from signals RFAE56−62+00 in ALUE1 38.

Signals AUNX56−62+00, the output of ALUE1 38, as well as mantissa sign signal RFAS63+00, are selected to generate the MUXX56−63+0B exponent signals during the normalization cycle. Signals MUXX56−63+0B indicate the exponent value and mantissa sign of the normalized result and are stored in REGE 58.

The scientific accumulators SA1, SA2, and SA3 are assigned to address locations 5, 6 and 7 respectively of RAMAM 30, RAMBM 32, RAMAE 34, and RAMBE 36.

An output register REGF 62, loaded from CP 12 by signals FREQ00−15+00, stores signals TASK02+10 and TASK03+10, which define the address location of SA#, and signals TASK14+10 and TASK15+10, which define the address location of SAN of address locations 5, 6 and 7. One of the scientific accumulators SA1, SA2, or SA3 is designated as SA# and one of the scientific accumulators is designated as SAN. A register REGM4 68 stores indications of the word length of the accumulators and the operands transferred from memory (two words of 32 bits or four words of 64 bits). REGM4 68 is loaded from REGD 66 through signals REGD24−31+00.

Round 84 generates a rounding constant and applies it as signal RFMA24−00 in response to signal RFMA24−10, or signal RFMA56−00 applied to junction 85. The rounding operation is described in copending related U.S. application Ser. No. 092,907 entitled "Automatic Rounding of Floating Point Operands."

Control store 52 generates signals CRK0N0−4+00 to provide firmware control of the normalize operation. Control store 52 generates signals CRSUB+00 and CRADD+00 which when combined in ALU function logic 54 with mantissa sign signals RFAS63+00 and RFBS63+00 generate the signals CRAS0H−3H+01 and CRAS0L−3L+01 for controlling the ALU 50 operation. A number of control signals applied to the shifter 42 are described infra.

Register REGFC 90 provides the function code signals FUNC0−5+00 received from cache/memory management unit 8 via signals LBCMD3−8+00.

Switch indicator signals SIPI0,2−7+00 are applied to shifter 42 from a register REGSW 92.

Error mask signals M5TMR0−7+00 are applied, as the output of a register REGM5 94, to shifter 42. Data bus signals REGD00−31+00 are inverted by an inverter driver 33 as signals REGD00−31−11. Signals REGR00−63−00 are inverted by an inverter driver 31.

Figure 3:
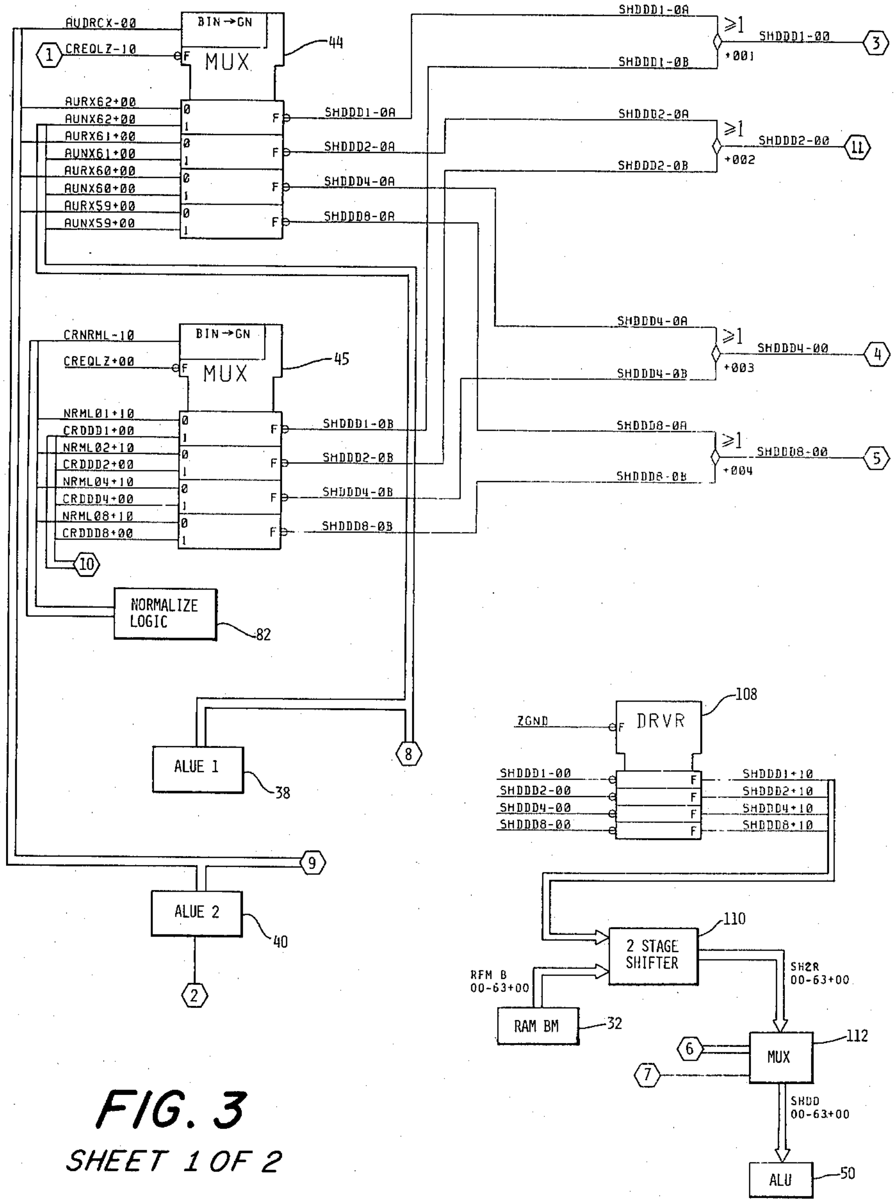
FIG. 3 is a detailed logic diagram of the PROM and PROM addressing logic.
Figure 3:
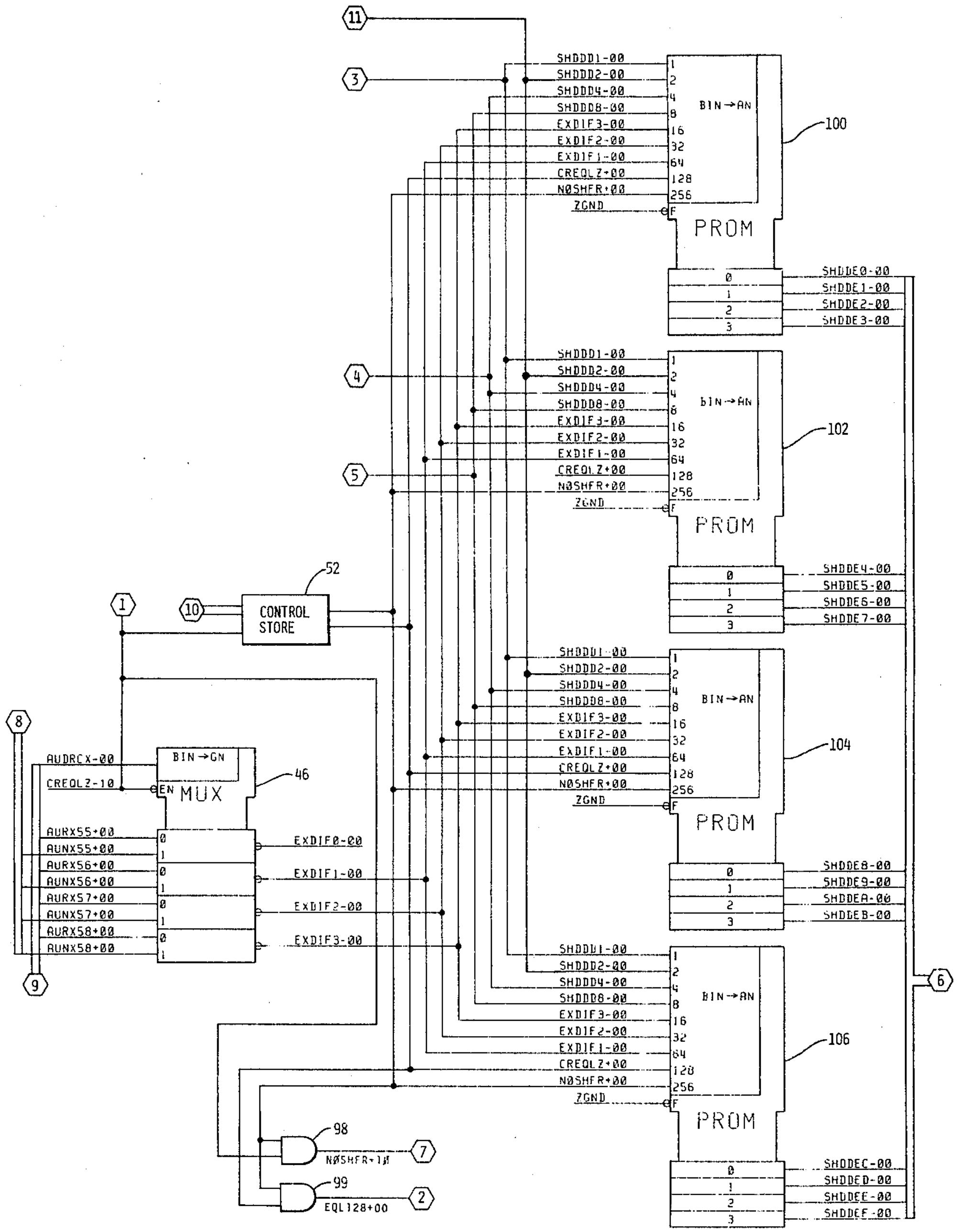

Referring to FIG. 3, the output of RAMBM 32, signals RFMB00−63+00, in the case of the scientific ADD operation, the contents of SA#, are applied to a two stage shifter input 110 of shifter 42.

The output signals SH2R00−63+00, which are a representation of the input signals RFMB00−63+00 shifted an amount specified by signals SHDDD 1,2,4,8+10, are applied to input terminal 0 of a MUX 112. The output of registers REGFC 90, REGSW 92 and REGM5 94, and REGM4 68, signals FUNC0−5+00, SIPI0,2−7+00, M5TMR0−7+00 and M4SMR0−7+00 respectively, is applied to input terminal 1 of MUX 112. This is shown in detail in FIG. 4. The MUX 112 output signals SHDD00−63−00 are applied to ALU50. MUX 112 under control of PROM's 100, 102, 104 and 106 output signals SHDDE0−F−00 force the necessary hexadecimal ZERO's as the shifter 42 output.

Signals indicating the number of hexadecimal digits to be shifted are generated in the following manner. The ALUE1 38 and ALUE2 40 output signals AUNX55−62+00 and AURX55−62+00 both indicate the difference in exponents between SA# read from RAMAE 34 and SAN read from RAMBE 36. Output signal AUDRCX−00 at logical ZERO indicates that the exponent of SAN is larger thereby selecting signals AURX55−62+00 applied to input terminal 1 of MUX's 44 and 46. MUX's 44 and 46 invert the signals AURX56−62+00 as SHDDD 1,2,4,8−0A and EXDIF0−3−00.

Normalize signals NRML 01,02,04 and 08+10 are applied to the input terminals of a MUX 45 and indicate the number of positions the result from ALU50 is shifted during the normalize cycle to move the most significant hexadecimal digit, not hexadecimal ZERO, to the left-most position. The normalize operation is an end around or barrel shift with the ZEROs on the left ending up to the right of the low order hexadecimal digit. The MUX 45 output is enabled by control store signal CREQLZ+00 at logical ZERO. Note that signal CREQLZ−10 is at logical ONE at that time thereby disabling the MUX 44 output signals SHDDD 1,2,4,8−0A. MUX's 44 and 45 are 74S258 circuits with a high output impedence when disabled. This circuit is described in "The TTL Databook for Design Engineers", Second Edition, Copyright 1976 by Texas Instruments.

The MUX 45 output signals SHDDD 1,2,4,8−0B are combined with the MUX 44 output signals SHDDD 1,2,4,8−0A as signals SHDDD 1,2,4,8−00 and are applied to the input address terminals of PROM's 100, 102, 104 and 106. Signals SHDDD 1,2,4,8−00 are also applied to the input of a driver 108. The output signals SHDDD 1,2,4,8+10 are applied to the input of the 2 stage shifter 110 of shifter 42 and indicate the number of hexadecimal positions to shift.

PROM's 100, 102, 104 and 106 are 5624 circuits described in the Intersil Semiconductor Products Catalog issued by Intersil, Inc., 10900 North Tantau Avenue, Cupertino, Calif., issued March, 1974.

Signals CRDDD 1,2,4,8+00 are applied to the input terminal of MUX 45 to allow firmware control of the shifter through signal CRNRML−10.

Signals CREQLZ+00 at logical ONE and NOSHFR+00 at logical ZERO provides for the mantissa justification as a result of exponent equalization.

Signals CREQLZ+00 at logical ZERO and NOSHFR+00 at logical ONE provide the output signals of register REGM4 68, REGFC 90, REGSW 92, REGM5 94 and control store 52, which are applied to input terminal 1 of selected multiplexers of MUX 112.

The layout of PROM's 100, 102, 104 and 106 is shown in FIG. 5. Note that an address location of a PROM stores 4 binary bits. A particular address applied to the 4 PROM's 100, 102, 104 and 106 will result in the readout of 16 binary bits which are applied to output signal lines SHDDE0−F−00.

Address locations 000-127 store binary ZEROs in all binary bit positions indicating that all of MUX 112 is enabled. That is, MUX's 174 through 204 are enabled.

Figure 4:
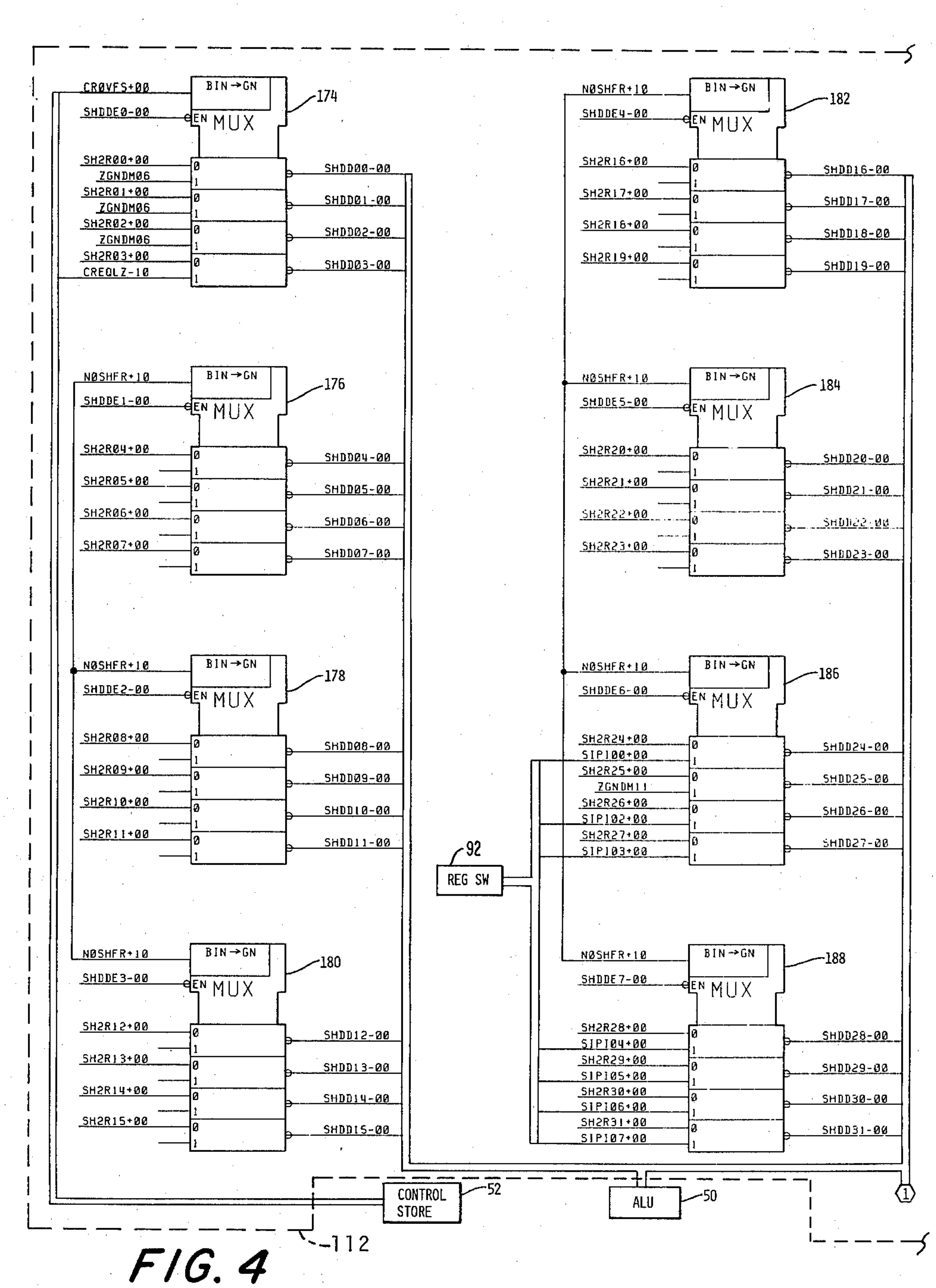
FIG. 4 is a detailed logic diagram of the output multiplexers.
Figure 4:
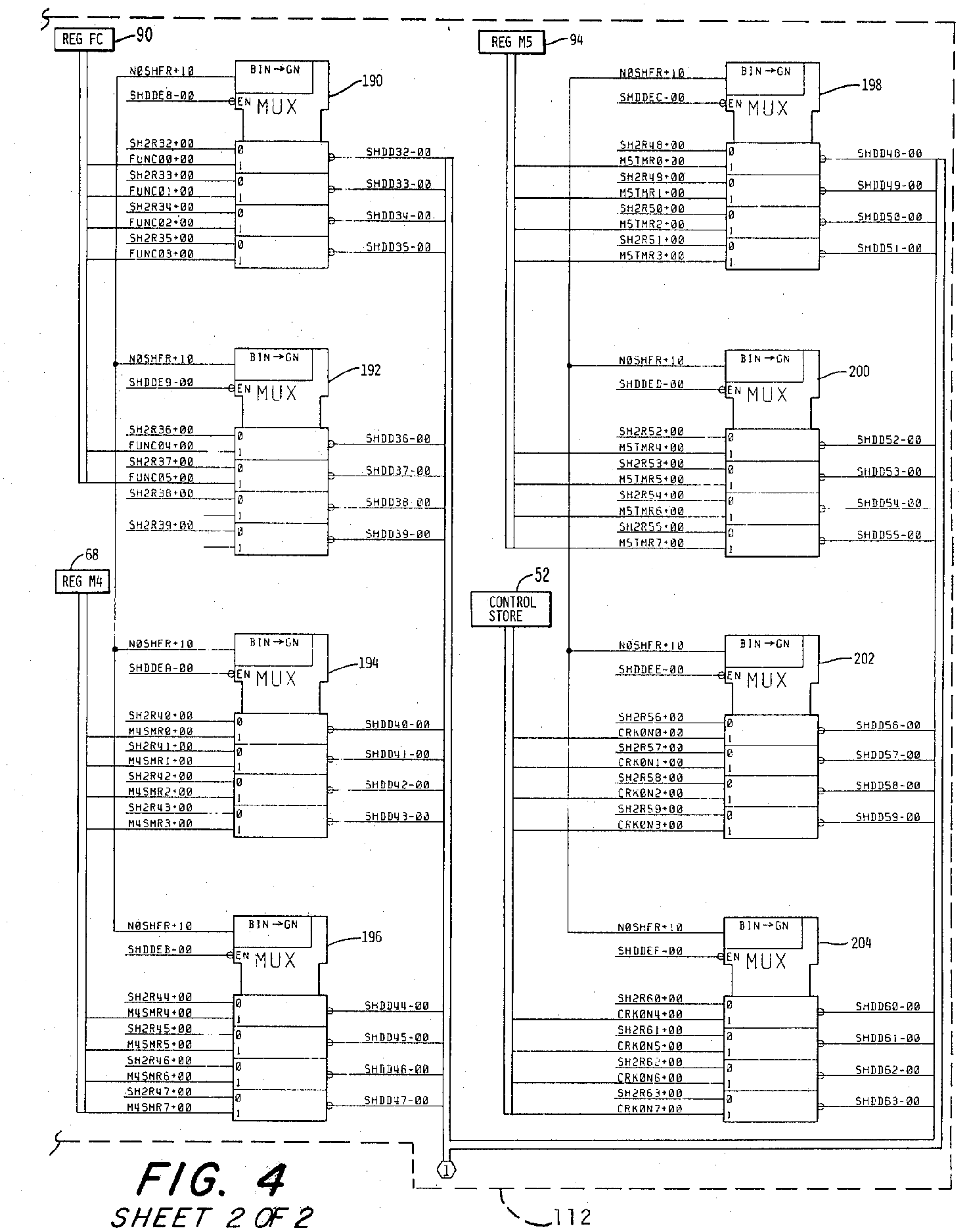

FIG. 4 shows the detailed logic circuitry of the MUX 112 made up of 16 multiplexers, MUX's 174 through 204. The 2 stage shifter 110 output signals SH2R00−63+00 are applied to input terminal 0 of MUX's 174 through 204. The PROM's 100, 102, 104 and 106 output signals SHDDD0−F−00 are applied to the enable terminal of MUX's 174 through 204 respectively.

Constant information, the output of register REGSW 92, signals SIPI00,02−07+00, is applied to input terminal 1 of MUX's 186 and 188. The output of register REGFC 90, signals FUNC00−05+00, is applied to input terminal 1 of MUX's 190 and 192. The output of register REGM4 68, signals M4SMR0−7, is applied to input terminal 1 of MUX's 194 and 196. The output of register REGM5 94, signals M5TMR0−7, is applied to input terminal 1 of MUX's 198 and 200. The control store 52 signals CRK0N1−7+00 are applied to input terminal 1 of MUX's 202 and 204. Signal NOSHFR+10, the output of an AND gate 98, selects the MUX's 176 through 204 input signals. Signal NOSHFR+10 is at logical ONE when control store 52 input signals CREQLZ−00 and NOSHFR+00 are at logical ONE. Address locations 375 through 382 of PROM's 100, 102, 104 and 106 control the selection of the constants.

The information stored in PROM's 100, 102, 104 and 106 address locations 128 through 255 enables the output of MUX's 174 through 204 for the mantissa equalization operation. If any of signals EXDIF1−3−00 are at logical ZERO, indicating a shift of greater than 16 hexadecimal digits, then one of the addressed locations 128 through 239 store logical ONE's, MUX's 174 through 204 are disabled forcing hexadecimal ZEROs as the shifter 42 output.

A 15 hexadecimal digit shift right during the mantissa equalization operation selects address location 240. Signals SHDDD 1,2,4,8−00 are at logical ZERO, and CREQLZ+00 and, EXDIF1−3−00 are at logical ONE. This forces the SHDDEF−00 output signal of PROM 106 to logical ZERO thereby enabling MUX 204. A mantissa of 1234 5678 9ABC DEOO, shifted right 15 hexadecimal positions appears at the shifter 42 output as 0000 0000 0000 0001.

The contents of address locations 240 through 255 enable MUX's 174 through 204 in a sequential fashion as shown in FIG. 5. The contents of address location 241 enable MUX's 202 and 204 since signals SHDDEE−00 and SHDDEF−00 are at logical ZERO. The contents of address location 255 indicating a zero right shift enable all 16 MUX's 147 through 204.

Control store 52 signals NOSHFR+00 at logical ONE and CREQLZ+99 at logical ZERO selects the input terminal 1 inputs of MUX's 176 through 204, FIG. 4, and MUX 45, FIG. 3. The control store 52 signals CRDDD 1,2,4,8+00 applied to MUX 45, FIG. 3, select address locations 375 through 383 thereby selecting the constants applied to input terminal 4, MUX's 186 through 204. The contents of PROM 102 address location 378 enables MUX's 186 and 187 thereby selecting the output of REGSW 92, FIG. 2, signals SIPI00,02−07+00. The contents of PROM 104 address location 379 enable MUX's 190 and 192 thereby selecting the output of REGFC 90, signals FUNC00−05+00. The contents of PROM 104 address location 380 enable MUX's 194 and 196 which select the output of REGM4 68, signals M4SMR0−7+00. The contents of PROM 106 address location 381 enable MUX's 198 and 200 which select the output of REGM5 94 signals M5TMR0−7+00. The contents of PROM 106 address location 382 enable MUX's 202 and 204 which select control signals CRK0N0−7+00.

Control store 52 signals CREQLZ+00 and NOSHFR+00 at logical ONE perform precision error detection during floating point to integer conversion. PROM's 100, 102, 104 and 106 address locations 384 through 399 are used in the floating points to integer conversion to test if there is a precision error.

Assume a floating point mantissa of $0.1234\ 5600\ 0000\ 0000_{16}$ with an exponent of +4. The output of the 2 stage shifter 110, FIG. 3, is $0.5600\ 0000\ 0000\ 1234_{16}$ and the output of MUX 112 is $0.5600\ 0000\ 0000\ 0000_{16}$. This output indicates that there is a precision error in the floating point to integer conversion.

Since exponents are in the excess 64 form, an exponent of +4 appears as $10000100_2$. This is subtracted from $1000000_2$ in ALUE1 38 giving a result on signal lines AUNX56−62+00 of $1111100_2$. Signal AUDRCX−00, the carry output of ALUE2 40, is at logical ONE. Signal EQL128+00, the output of AND gate 99, is applied to the high order bit position of the B side of ALUE2 40. Signal EQL128+00 is at logical ONE when address locations 384 through 399 of PROM's 100, 102, 104 and 106 are addressed. The B side of ALUE2 40, being larger than the A side, forces the carry signal AUDRCX−00 to logical ONE thereby selecting the input signals AUNX55−62+00 of MUX's 44 and 46 The output signals SHDDD 1,2,4,8−OA of MUX 44 are $1100_2$ respectively, and the output signals SHDDD 1,2,4,8−OB are $0000_2$ respectively. The output signals SHDDD 1,2,4,8+10 are $0011_2$ respectively.

For the floating point to integer operation, signals CREQLZ+00 and NOSHFR+00 are at logical ONE, as are signals SHDDD1−00 and SHDDD2−00, thereby selecting address location 387 of PROM's 100, 102, 104 and 106. Output signals SHDDEC−F−00 are at logical ONE. MUX's 198, 200, 202 and 204 are not enabled thereby forcing hexadecimal 1,2,3 and 4, the MUX's 198 through 204 inputs to hexadecimal 0000. MUX's 174 and 176 are enabled providing an output of hexadecimal 5 and 6 indicating a precision error. If the outputs of MUX's 174 through 204 are all ZEROs, this would indicate a floating point to integer conversion with no precision error.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A shifter unit for performing scientific arithmetic operations comprising:

shifting means for receiving a mantissa and responsive to a plurality of shift signals for generating a plurality of shifter signals indicative of said mantissa shifted a number of positions specified by said shift signals;

multiplexer means coupled to said shifting means for receiving said shifter signals for transfer to an output;

read only memory means responsive to said plurality of shift signals for generating a plurality of enabling signals in a first state and a plurality of enabling signals in a second state, said multiplexer means being coupled to said read only memory means and responsive to said enabling signals in said first state for transferring said plurality of shifter signals, and responsive to said enabling signals in said second state for transferring characters having a value of ZERO to said output.

2. The shifter unit of claim 1 wherein said unit further comprises:

control means coupled to said multiplexer means and said read only memory means for generating a first plurality of control signals for defining a type of operation and a second plurality of control signals for defining constants and masks.

3. The shifter unit of claim 2 wherein said multiplexer means comprises:

a plurality of multiplexer circuits having said plurality of shifter signals applied to a first terminal, and register signals and said second plurality of control signals applied to a second terminal of selected ones of said plurality of multiplexer circuits, said multiplexer circuits being responsive to a first control signal in a first state or a second control signal in a second state of said first plurality of control signals for selecting said first terminal for transferring said plurality of shifter signals and said first control signal in said second state and said second control signal in said first state for selecting said second terminal for transferring said register signals and said second plurality of control signals to said output.

4. The shifter unit of claim 3 wherein each of said plurality of multiplexer circuits is responsive to an enabling signal of said plurality of enabling signals in said first state for transferring a hexadecimal character indicated by said plurality of shifter signals, said register signals, or said second plurality of control signals to said output, and said enabling signal in said second state for transferring one of said characters having said value of ZERO to said output.

5. The shifter unit of claim 4 wherein said read only memory means comprises:

a programmable read only memory having a plurality of address locations, each address location having a plurality of bit positions, each bit position storing a binary ONE or a binary ZERO, said programmable read only memory generating one of said plurality of enabling signals for each of said plurality of bit positions, said enabling signal in said first state being generated by said bit position storing said binary ZERO and said enabling signal in said second state being generated by said bit position storing said binary ONE, said one of said plurality of enabling signals being applied to each of said plurality of multiplexer circuits respectively.

6. The shifter unit of claim 5 wherein said read only memory means is responsive to said shift signals and to said first control signal in a second state and said second control signal in said second state for generating said enabling signals in said first state for enabling each of said plurality of multiplexer circuits for effecting an end around shift.

7. The shifter unit of claim 6 wherein said read only memory means is responsive to said shift signals and to said first control signal in said first state and said second control signal in said second state for generating said enabling signals in said first state for enabling a first set of said multiplexers for transferring said shifter signals mantissas to said output and for generating said enabling signals in said second state for disabling a second set of said multiplexers for transferring said ZERO characters to said output, said ZERO characters being in the high order positions of an operand including said mantissa and said ZERO characters;

said read only memory means generating said enabling signal in said second state for said each of said multiplexer circuits for transferring said operand having said ZERO characters in all of said operand character positions when said shift signals indicate a shift of greater than the number of said operand character positions.

8. The shifter unit of claim 7 wherein said read only memory means is responsive to said shift signals, said first control signal in said second state, and said second control signal in said first state for generating said enabling signals in said first state for enabling said selected ones of said plurality of multiplexer circuits, said first control signal in said second state and said second control signal in said first state selecting said second terminals of said multiplexers for transfer of selected ones of said register signals or said second plurality of control signals to said output.

9. The shifter unit of claim 8 wherein said read only memory means is responsive to said shift signals and said first and said second control signals in said second state for generating said enabling signals in said second state for disabling said multiplexer circuits that suppress the number of character positions equal to a register size of said output, and generating said enabling signals in said first state for enabling said multiplexer circuits for transferring precision error characters to said output, said operand having a number of ZERO characters equal to said register size in the left character positions of said operand and said precision error characters in the right character positions of said operand, said operand indicating a precision error if at least one of said precision error characters is not a ZERO character.

10. The shifter unit of claim 9 wherein said characters are hexadecimal characters.

11. A processor for performing scientific arithmetic comprising:

random access memory means for storing a first operand comprising a first exponent and a first mantissa, and a second operand comprising a second exponent and a second mantissa;

first arithmetic logic unit means coupled to said random access means for generating shift signals indicative of the difference between said first and said second exponents;

address selection means coupled to said first arithmetic logic means and said random access memory means for selecting said first mantissa if said first exponent is smaller than said second exponent and selecting said second mantissa if said second exponent is smaller than said first exponent;

shifting means coupled to said random access memory means and to said first arithmetic logic means for receiving said selected mantissa for shifting a number of positions indicated by said shift signals;

second arithmetic logic means coupled to said random access memory means and to said shifting means for receiving said selected mantissa, shifted said number of positions;

wherein said shifting means include:

shifter means for receiving said selected mantissa and responsive to said shift signals for generating a plurality of shifter signals indicative of said selected mantissa shifted said number of positions;

multiplexer means coupled to said shifter means for receiving said shifter signals for transfer to said second arithmetic logic means;

read only memory means responsive to said plurality of shift signals for generating a plurality of enabling signals in a first state and a plurality of enabling signal, in a second state, said multiplexer means being coupled to said read only memory means and responsive to said enabling signals in said first state for transferring said plurality of shifter signals, and responsive to said enabling signals in said second state for transferring characters having a value of ZERO to said second arithmetic logic means.

12. The shifter unit of claim 11 wherein said unit further comprises:

control means coupled to said multiplexer means and said read only memory means for generating a first plurality of control signals for defining a type of operation and a second plurality of control signals for defining constants and masks.

13. The shifter of claim 12 wherein said multiplexer means comprises:

a plurality of multiplexer circuits having said plurality of shifter signals applied to a first terminal, and register signals and said second plurality of control signals applied to a second terminal of selected ones of said plurality of multiplexer circuits, said multiplexer circuits being responsive to a first control signal in a first state or a second control signal in a second state of said first plurality of control signals for selecting said first terminal for transferring said plurality of shifter signals and said first control signal in said second state and said second control signal in said first state for selecting said second terminal for transferring said register signals and said second plurality of control signals to said second arithmetic logic means.

14. The shifter unit of claim 13 wherein each of said plurality of multiplexer circuits is responsive to an enabling signal of said plurality of enabling signals in said first state for transferring a character indicated by said plurality of shifter signals, said register signals, or said second plurality of control signals to said second arithmetic logic unit output, and said enabling signal in said second state for transferring one of said characters having said value of ZERO to said output.

15. The shifter unit of claim 14 wherein said read only memory means comprises:

a programmable read only memory having a plurality of address locations, each address location having a plurality of bit positions, each bit position storing a binary ONE or a binary ZERO, said programmable read only memory generating one of said plurality of enabling signals for each of said plurality of bit positions, said enabling signal in said first state being generated by said bit position storing said binary ZERO and said enabling signal in said second state being generated by said bit position storing said binary ONE, said one of said plurality of enabling signals being applied to each of said plurality of multiplexer circuits respectively.

16. The shifter unit of claim 15 wherein said read only memory means is responsive to said shift signals and to said first control signal in a second state and said second control signal in said second state for generating said enabling signals in said first state for enabling each of said plurality of multiplexer circuits for effecting an end around shift.

17. The shifter unit of claim 16 wherein said read only memory means is responsive to said shift signals and to said first control signal in said first state and said second control signal in said second state for generating said enabling signals in said first state for enabling a first set of said multiplexers for transferring said shifter signals to said second arithmetic logic means and for generating said enabling signals in said second state for disabling a second set of said multiplexers for transferring said ZERO characters to said second arithmetic logic means, said ZERO characters being in the high order positions of an operand including said mantissa and said ZERO characters;

said read only memory means generating said enabling signal in said second state for said each of said multiplexer circuits for transferring said operand having said ZERO characters in all of said operand character positions when said shift signals indicate a shift of greater than the number of said operand character positions.

18. The shifter unit of claim 17 wherein said read only memory means is responsive to said shift signals, said first control signal in said second state, and said second control signal in said first state for generating said enabling signals in said first state for enabling said selected ones of said plurality of multiplexer circuits, said first control signal in said second state and said second control signal in said first state selecting said second terminal of said multiplexers for transfer of selected ones of said register signals or said second plurality of control signals to said second arithmetic logic means.

19. The shifter unit of claim 18 wherein said read only memory means is responsive to said shift signals and said first and said second control signals in said second state for generating said enabling signals in said second state for disabling said multiplexer circuits that suppress the number of character positions equal to a register size of a central processor register, and generating said enabling signals in said first state for enabling said multiplexer circuits for transferring precision error characters to said second arithmetic logic means, said operand having a number of ZERO characters equal to said register size in the left character positions of said operand and said precision error characters in the right character positions of said operand, said operand indicating a precision error if at least one of said precision error characters is not a ZERO character.

20. The shifter unit of claim 19 wherein said characters are hexadecimal characters.

* * * * *